Sept. 15, 1970     M. SMITH     3,528,118
COUNTERBALANCING MECHANISM FOR A DOCKBOARD
Filed Oct. 23, 1968     2 Sheets-Sheet 1
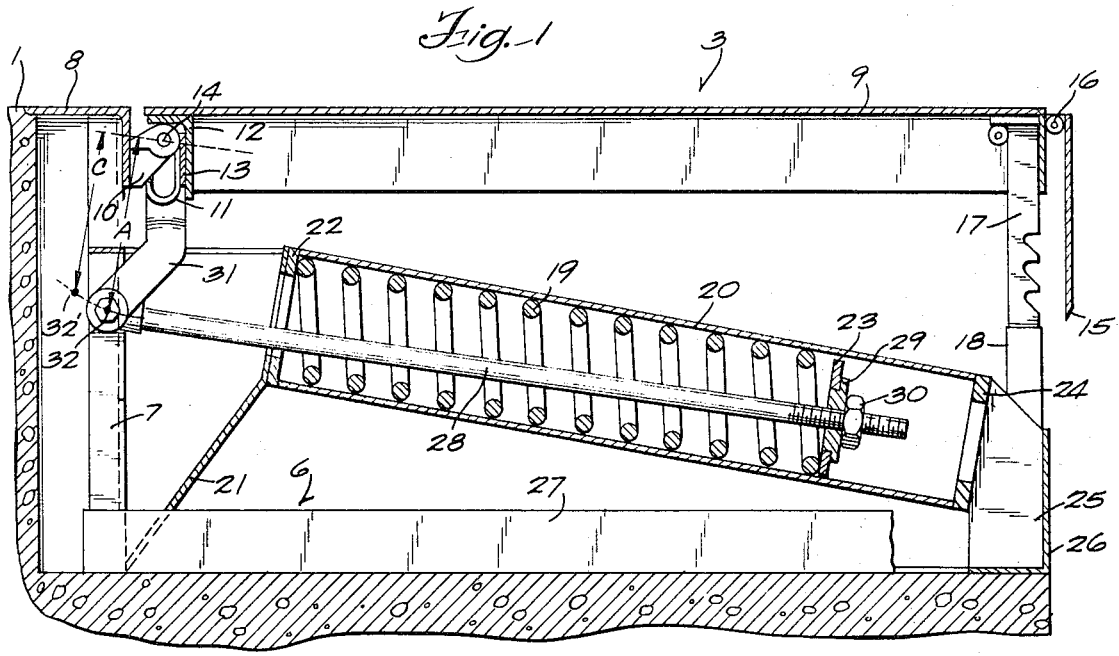
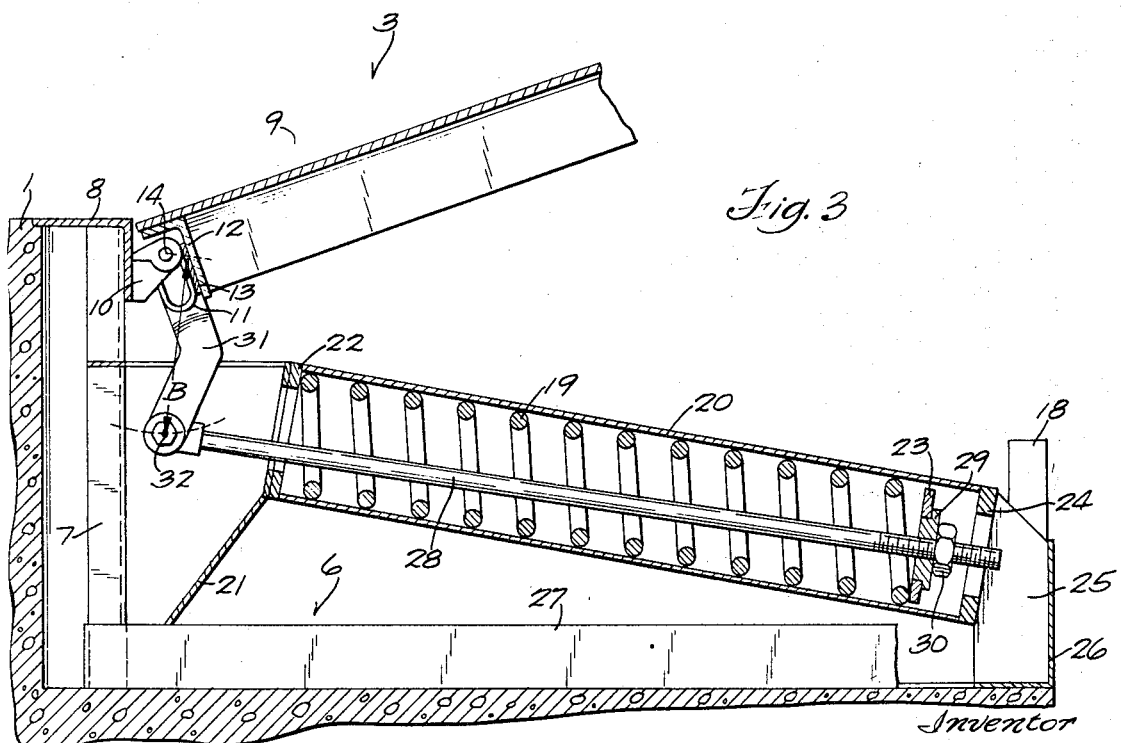
Inventor
MATTHEW SMITH Inventor
MATTHEW SMITH – # United States Patent Office 3,528,118
Patented Sept. 15, 1970

3,528,118
COUNTERBALANCING MECHANISM FOR A DOCKBOARD
Matthew Smith, West Allis, Wis., assignor to Kelley Company, Inc., Milwaukee, Wis., a corporation of Wisconsin
Filed Oct. 23, 1968, Ser. No. 770,054
Int. Cl. B65g 11/00
U.S. Cl. 14—71                    11 Claims

ABSTRACT OF THE DISCLOSURE

An improved counterbalancing mechanism for a dockboard adapted to bridge the gap between a loading dock and a carrier. The dockboard is mounted in a pit in the dock and includes a ramp having its rear edge hinged to the upper surface of the dock. When the dockboard is in a storage position, the ramp is located generally flush with the upper surface of the dock, and when released from its storage position, a coil spring mounted beneath the ramp acts to bias the ramp upwardly to an inclined position. The rear end of the coil spring is fixed to the dock, while the forward end of the spring carries a rod which extends axially within the spring and the inner or rear end of the rod is pivotally connected to a lever arm secured to the inner edge of the ramp. The lever and the spring are arranged so that the moment acting about the pivotal connection of the ramp to the dock and produced by the spring force acting through the rod against the lever arm will tend to balance the changing moment of the ramp throughout the arc of pivotal movement of the lever arm.

---

The invention relates to a dockboard and more particularly to a mechanism for counterbalancing the ramp of the dockboard.

Dockboards in general are adapted to be installed on loading docks to bridge the gap between the dock and the bed of a truck or other carrier. The conventional dockboard includes a ramp which is pivotally mounted at its rear edge to the loading dock while the front edge of the ramp is located adjacent the front of the dock and is provided with an extension lip which is hinged to the ramp. The entire dockboard is mounted within a shallow pit or depression in the dock and when in the storage position, the ramp will be flush with the upper surface of the dock and the lip will hang downwardly in a pendant position.

To operate the conventional dockboard, the truck or carrier to be loaded or unloaded is backed into position in front of the dock and a holddown device is then manually released thereby permitting the counterbalancing mechanism to urge the ramp to an upward inclined position and at the same time the extension lip is extended to a position somewhat short of its fully extended working position. With the ramp in this position, the operator can walk out onto the ramp and the weight of the operator overcomes the force of the counterbalancing mechanism with the result that the ramp is lowered and the extension lip is moved down onto the carrier bed.

The counterbalancing mechanism which is employed in the conventional dockboard to urge or bias the ramp upwardly, generally consists of a series of coil springs. As the spring force decreases as the springs extend, the springs are generally connected to the ramp through a complex linkage or cam mechanism in an attempt to compensate for the variation in spring force. Even though the dockboard may include a mechanism for compensating for the variation in spring force, it is often difficult for a light-weight person to walk the ramp down to the horizontal position.

The present invention is directed to an improved counterbalancing system for the ramp of a dockboard utilizing a coil spring in which the spring force is applied to the inner end of the ramp at a substantially uniform rate throughout the entire range of pivotal movement of the ramp. More specifically, a coil spring is mounted in a fore-to-aft position beneath the ramp, and the inner or rear end of the coil spring is fixed to the dock while the forward end of the spring carries a rod which extends axially inwardly within the spring. The inner end of the rod is pivotally connected to the lower end of a lever arm secured to the inner edge portion of the ramp. The lever arm and the spring are arranged with respect to each other so that the moment arm acting about the pivotal connection of the ramp to the dock and produced by the spring force acting through the rod against the lever arm will tend to balance the changing moment of the ramp throughout the arc of pivotal movement of the lever arm.

With this construction, the moment being applied to the ramp is substantially proportional to the moment of the ramp at all inclinations of the ramp, making the ramp easier to walk down by the operator to the horizontal position.

The construction of the invention eliminates the complex linkages or cam mechanisms which are employed in conventional dockboards in an attempt to compensate for variations in the spring force, thereby resulting in a less expensive but more reliable unit.

In the conventional dockboard, the force to urge the ramp upwardly is normaly applied near the outer end of the ramp, and as the force is applied, the inner hinged end of the ramp will tend to lift above the dock level due to a slotted connection between the ramp and the dock. When the ramp reaches its fully inclined position, the inner end of the ramp will then fall by gravity to a position where it is flush with the dock. However, when the hinged inner end of the ramp is raised slightly above dock level as the ramp is being pivoted upwardly, the raised inner end can provide an obstacle to a truck and can also pinch the feet of the operator. However, with the dockboard construction of the invention, the force applied to the ramp to pivot it upwardly is applied to the inner end of the ramp in a direction to force the hinged end of the ramp downwardly and thereby eliminate this problem which occurs with a conventional dockboard.

As a further advantage, the counterbalancing mechanism of the invention provides a better balance of the board so that the hold-down pressure to hold the ramp at dock level can be minimized.

Other objects and advantages will appear in the course of the following description.

The drawings illustrate the best mode presently contemplated of carrying out the invention.

In the drawings:

FIG. 1 is a vertical section showing the dockboard of the invention as associated with a loading dock, and illustrating the ramp in the horizontal cross-traffic position;

FIG. 3 is a view similar to FIG. 1, showing the ramp in the upward inclined position.

Figure 2:
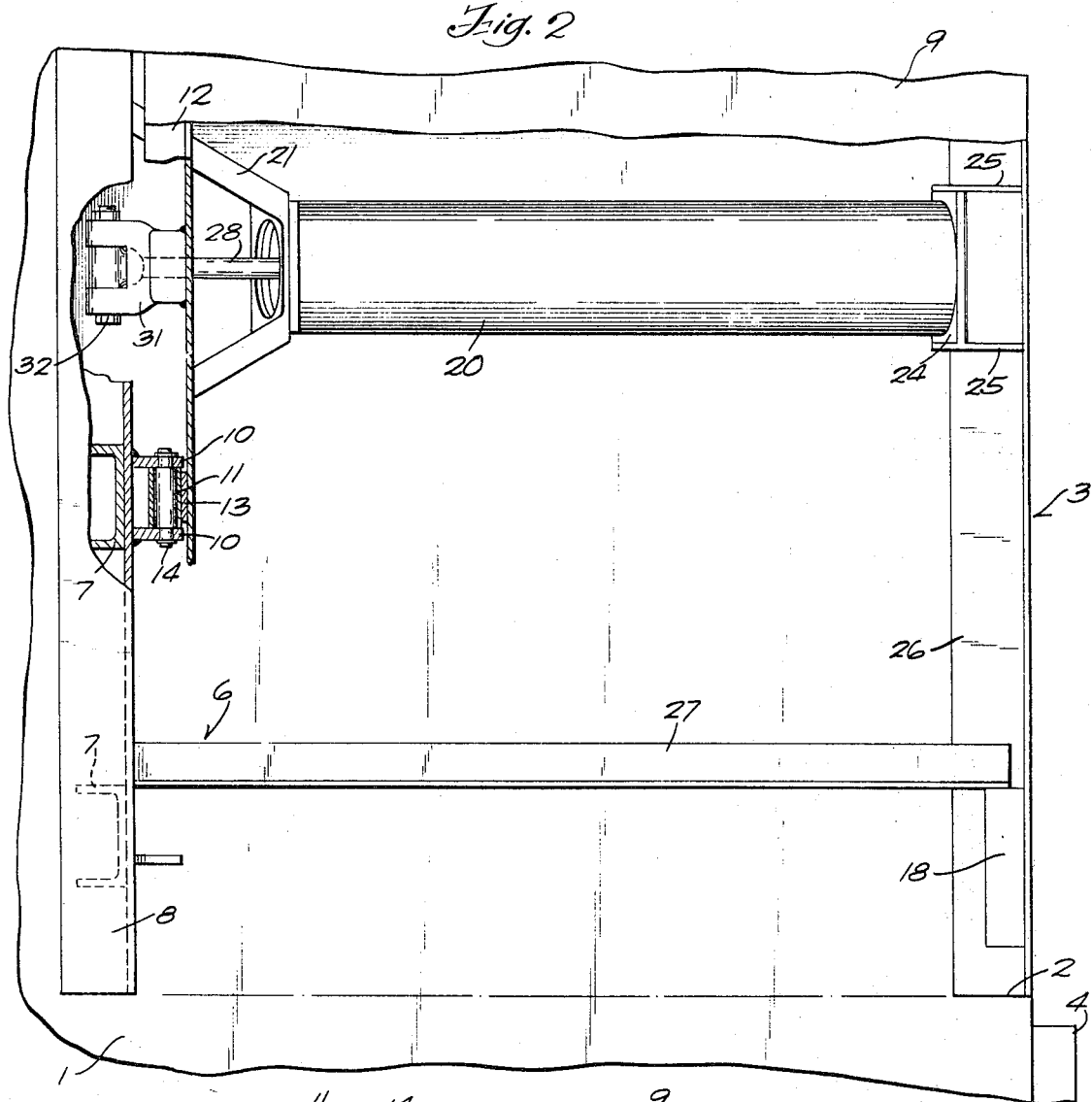
FIG. 2 is a plan view with parts broken away in section of the dockboard.
Figure 4:
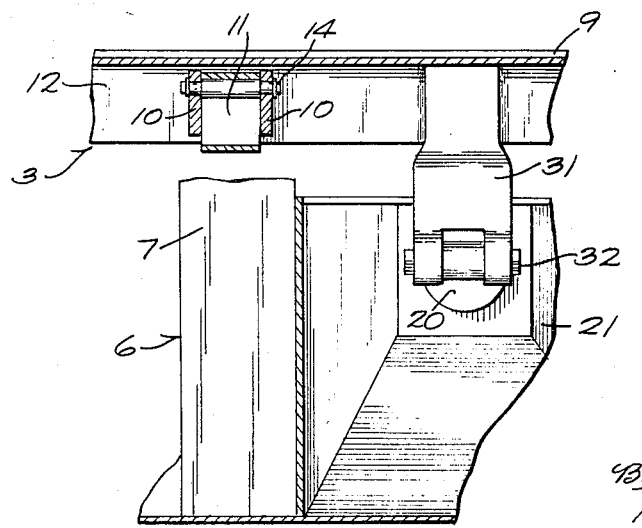
FIG. 4 is a section taken along line 4—4 of FIG. 1.

The drawings illustrate a loading dock 1 formed with a shallow pit or depression 2, and a dockboard 3 is installed in the pit 2. A pair of bumpers 4 are mounted on the front wall 5 of dock 1 and serve to protect the dockboard as a truck or other carrier is backed toward the dock 1.

The dockboard 3 is provided with a frame 6 which includes a series of vertical channels 7 that carry a horizontal angle 8. The upper flange of angle 8 is substantially flush with the upper surface of the dock 1.

The inner edge of a ramp 9 is pivotally connected to the angle 8. Two pairs of lugs 10 are secured to the vertical flange of angle 8 and each pair of lugs 10 straddles a generally U-shaped member 11 which is welded to angle 12 on the inner edge of ramp 9. A spacer 13 is welded between the U-shaped member 11 and the vertical flange of angle 12. To provide the pivotal connection between the ramp 9 and the dock 1, pins 14 extend through aligned openings in the lugs 10 as well as through the central slot in the U-shaped member 11. With the slotted connection provided by the U-shaped member 11, the inner edge of the ramp can shift vertically to compensate for variations in level of the bed of the carrier or truck, thereby enabling the ramp to tilt slightly in the event the bed of the carrier is at a slight angle to the horizontal.

An extension lip 15 is pivotally connected by hinge 16 to the forward edge of ramp 9. In the storage or cross traffic position, as shown in FIG. 1, the lip will assume a pendant position in which it hangs downwardly in front of the ramp. As the ramp is pivoted upwardly to an inclined position, as shown in FIG. 3, the extension lip 15 will be automatically pivoted outwardly to a partially extended position, and as the ramp is walked downwardly, the lip will then be brought down into engagement with the bed of the carrier. The extension lip 15 and the mechanism for operating the lip are not part of the present invention and may take the form of that shown in U.S. Pats. 3,137,017; 3,117,332 or Re. 25,249.

The front edge of ramp 9 may also carry a pair of downwardly extending struts 17 which are adapted to engage abutments 18 extending upwardly from the frame 6. The struts 17 and abutments 18 can be similar to that shown in Pat. 3,137,017 and serve to support the ramp in the cross traffic position as shown in FIG. 1. As in the case of the extension lip, the struts 17 and abutments 18 form no part of the present invention.

According to the invention, the ramp 9 is biased upwardly by a coil spring 19 which is located within a tubular sleeve 20 mounted on the frame 6 and extends in a fore and aft direction of the dockboard. The inner end of sleeve 20 is secured to a supporting structure 21 which is connected to the vertical channels 7 of frame 6, so that the sleeve 20 as well as the supporting structure 21 are fixed to the dock. The inner end of spring 19 seats against an end ring 22 in sleeve 20, while the outer end of the spring bears against a movable spring retainer 23 so that the force of the spring 19 will act to move the spring retainer 23 toward the forward edge of the dockboard.

To mount the outer or forward end of the sleeve 20 to the frame 6, a plate 24 is secured to the forward end of the sleeve and plate 24 is connected between a pair of vertical plates 25 extending upwardly from the front angle member 26 of frame 6. The frame also includes a series of horizontal angles 27 which are connected between the front angle 26 and the vertical channels 7.

A rod 28 is disposed centrally of the coil spring 19, and the forward end of the rod extends through a plug 29 attached to spring retainer 23 and is secured to the plug by means of a nut 30 which is threaded on the forward end of the rod. The rear end of the rod 28 projects beyond the rear end of spring 19 and is pivotally connected to the lower end of a lever arm 31 by a pin 32.

The upper end of the lever arm 31 is welded to the angle 12 on the inner edge of the ramp 9. The force of the spring 19 acts to move the rod 28 forwardly and thereby pivot the lever arm 31 forwardly to bias the ramp to the inclined position, as shown in FIG. 3.

The dockboard includes a conventional hold-down or locking mechanism, similar to that shown in U.S. Pats. 3,137,017; 3,117,332 or Re. 25,247, which retains the ramp in the horizontal or cross traffic position shown in FIG. 1. When the hold-down mechanism is manually released by the operator, the force of the spring 19 will then act through the lever arm 31 to pivot the ramp upwardly to the inclined position as shown in FIG. 3. Simultaneously, the extension lip 15 is pivoted outwardly to a partially extended position as previously described. The operator then walks forwardly on the ramp and the weight of the operator will overbalance the force of the spring 19, thereby causing the ramp to pivot downwardly until the extension lip 15 engages the bed of the carrier or truck. The hold-down mechanism will then automatically hold the ramp in this position.

The spring 19 and lever arm 31 are arranged with respect to each other so that the moment acting about the axis of pins 14 and produced by the spring force acting through the rod 28 against the lever arm 31, will tend to balance the changing moment of the ramp throughout the entire arc of pivotal movement of the lever arm. The moment is determined by the force of the spring multiplied by the distance through which the spring force is acting which distance is the lever arm radius. As the spring 19 extends, the spring force will lessen. However, the distance through which the spring force is acting will be increased as the spring extends so that the moment is substantially proportional to the ramp moment throughout the arc of pivotal movement of the lever arm. More specifically, as shown in FIG. 1, the force of the spring is acting through distance A so that the moment will be the product of the spring force and the distance A. As the ramp moves upwardly, to a partially inclined position the moment of the ramp will be decreased and the spring force will be lessened and will act through a greater distance so that the moment will be substantially proportional to the ramp moment even though the spring force has decreased to some extent. When the ramp is fully raised, as shown in FIG. 3, the spring is further extended so that the spring force is further reduced. In this position, the spring force is acting through the distance B which is greater than the distance A so that the total moment will be substantially proportional to the ramp moment which is now reduced by its increased inclination.

In some situations, when the ramp is supported on the bed of a carrier which is below dock level, the ramp may be inclined downwardly. In this case, the pin 32 would be at the position 32' and the force of the spring would be acting through the distance C, as shown in FIG 1. The distance C is shorter than the distance A but the spring force is somewhat greater so that the moment remains substantially proportional to the ramp moment in the below dock level position. In effect, the changing moment acts similar to a cosine cam to balance the changing moment of the ramp.

With the construction of the invention, the moment being applied to the ramp is substantially proportional at all times to the ramp moment and this enables the ramp to be more easily walked down to the horizontal position even by an operator of comparatively light weight. Moreover, the construction provides better balance of the ramp so that the hold-down force required to hold the ramp at the dock level or in the cross traffic position can be minimized.

The equalized force which is being applied to the ramp is accomplished through an inexpensive mechanism having few movings parts. The unit of the invention eliminates the complex linkages and cam mechanisms which have been used in conventional dockboards in an attempt to compensate for the difference in spring rate.

While the drawings show the use of a single coil spring as the counterbalancing force, it is contemplated that two or more coil springs may be utilized.

Various modes of carrying out the invention are contemplated as being within the scope of the following claims particularly pointing out and distinctly claiming the subject matter which is regarded as the invention.

I claim:

1. In a dockboard construction, a ramp, connecting means for pivotally connecting the rear edge portion of the ramp to a supporting structure, a lever arm having an upper end secured to the rear edge portion of the ramp and extending downwardly from the ramp, spring means disposed beneath the ramp and having one end secured to said supporting structure, and a connecting member connecting the opposite end of the spring means to the lower end of the lever arm, said lever arm and said connecting member being arranged with respect to each other so that the moment acting about said first connecting means and produced by the force of said spring means acting through said connecting member against said lever arm will tend to balance the changing moment of the ramp throughout the arc of pivotal movement of said lever arm.

2. The dockboard of claim 1, wherein said spring means comprises a coil spring extending in a fore and aft direction of said ramp.

3. The dockboard of claim 2, wherein said rear end of the spring is secured to the supporting structure and said connecting member comprises a rod connected to the forward end of the spring and extending within said spring.

4. The dockboard of claim 3, and including a tubular member fixed to the supporting structure and surrounding said coil spring.

5. The dockboard of claim 3, wherein the spring is arranged so that the force of the spring is exerted forwardly to thereby draw the rod forwardly and pivot the lower end of the lever arm forwardly and bias the ramp to an upwardly inclined position.

6. In a dockboard construction, a ramp, hinge means for connecting the rear edge portion of the ramp to a dock, a lever arm having an upper end secured to the ramp adjacent said hinge means and extending downwardly beneath the ramp, a coil spring located beneath the ramp and having its axis disposed in a front-to-rear direction with respect to the ramp, one end of said spring being connected to said dock, and a connecting member connecting the opposite end of the spring to the lower end of the lever arm, said spring being arranged so that that force of the spring acts in a direction toward the front of the ramp to thereby urge the ramp to an upwardly inclined position, said lever arm and said connecting member being arranged with respect to each other so that the moment acting about said hinge means and produced by the force of said spring acting through said connecting member against said lever arm will tend to balance the changing moment of the ramp throughout the arc of pivotal movement of said lever arm.

7. The dockboard of claim 6, wherein the rear end of the spring is connected to the dock and the connecting member is connected to the front end of the spring.

8. The dockboard of claim 7, wherein the connecting member extends within the spring and is spaced radially inward of the coils of the spring.

9. The dockboard of claim 8, and including means for permitting radial movement of said connecting member within the spring as the spring extends and contracts.

10. The dockboard of claim 8, and including tubular means secured to the dock and surrounding said spring for guiding said spring in extension and contraction.

11. The dockboard of claim 8, wherein the lower portion of said lever arm is bent rearwardly with respect to said ramp.

References Cited

UNITED STATES PATENTS

| | | | |
|---|---|---|---|
| 1,262,930 | 4/1918 | Diaz | 14—71 X |
| 3,216,373 | 11/1965 | Boone | 14—71 X |
| 3,299,456 | 1/1967 | Dieter | 14—71 |
| 3,411,168 | 11/1968 | Hecker | 14—71 |
| 3,444,574 | 5/1969 | Le Clear | 14—71 |

NILE C. BYERS, JR., Primary Examiner